United States Patent
Kapcoe et al.

(10) Patent No.: US 6,702,295 B1
(45) Date of Patent: Mar. 9, 2004

(54) DYNAMIC SEAL

(75) Inventors: John Christopher Kapcoe, Bretten (DE); Benjamin Cutler Clark, Milford, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/277,325

(22) Filed: Oct. 22, 2002

(51) Int. Cl.[7] .................................................. F16J 15/32
(52) U.S. Cl. ...................... 277/572; 277/551; 277/562; 277/571; 277/572; 277/576
(58) Field of Search .................... 277/549, 551, 277/562, 571, 572, 573, 576

(56) References Cited

U.S. PATENT DOCUMENTS

| | | |
|---|---|---|
| 3,021,161 A | 2/1962 | Rhoads et al. |
| 3,938,813 A | 2/1976 | Forch |
| 4,208,057 A | 6/1980 | Messenger |
| 4,470,605 A | 9/1984 | Deuring |
| 4,526,383 A | 7/1985 | Fuchs et al. |
| 4,655,618 A | 4/1987 | Labedan et al. |
| 4,986,553 A | 1/1991 | Preston et al. |
| 5,129,744 A | 7/1992 | Otto et al. |
| 5,183,269 A | 2/1993 | Black et al. |
| 5,207,436 A | 5/1993 | Lederman |
| 5,209,499 A | 5/1993 | Ruff, Jr. et al. |
| 5,211,406 A | 5/1993 | Katzensteiner |
| 5,553,866 A * | 9/1996 | Heinzen ..................... 277/551 |
| 5,713,579 A | 2/1998 | Petrak et al. |
| 6,199,869 B1 * | 3/2001 | Furuyama et al. .......... 277/559 |

* cited by examiner

*Primary Examiner*—Anthony Knight
*Assistant Examiner*—E Peavey
(74) *Attorney, Agent, or Firm*—Howard & Howard

(57) ABSTRACT

A dynamic seal assembly has an outer carrier member formed of one-piece having an outer flange, an inner flange, and an intermediate portion presenting first and second shoulders. A PTFE seal member is disposed about the second shoulder and is compressed axially by a case member which, while the PTFE seal is compressed, is staked to the carrier to secure the seal. The carrier has an axially outwardly facing annular pocket accommodating a foam dust excluder into which a flange of a wear sleeve extends to protect the PTFE seal from debris. Additionally, the seal has a clamping ring having an axially extending first leg providing a second mating surface radially inwardly and generally parallel to the first mating surface of the outer member. A second leg of the clamping ring extends radially inwardly and generally orthogonally from the first leg so that a seal member having an outer periphery forming a clamping surface can be fixed between the inner flange of the outer member and the second leg of the clamping ring. With the seal located between the members, an interlocking portion formed in and extending radially outwardly from the second mating surface and into the first mating surface retains the clamping ring in an axially stationary position.

21 Claims, 1 Drawing Sheet

DYNAMIC SEAL

BACKGROUND OF THE INVENTION

1. Field of the Invention

The invention relates generally to oil seals used for sealing a rotatable shaft extending through a housing.

2. Related Art

Dynamic oil seals often employ a sealing disc or wafer made of polytetrafluoroethylene (PTFE) for its superior sealing properties. The PTFE water is typically clamped between inner and outer case members. The multi-piece case is then pressed into engagement with a metal carrier for mounting on a housing or the like about a rotating shaft to be sealed. The multi-piece construction of the carrier/case lends itself to multiple forming operations and assembly steps to prepare such a seal. In one such operation, the axially outer edge of the outer carrier member is curled in a forming operation about the end of the inner case member to secure the PTFE disc therebetween in an axially compressed condition. The curling operation requires special forming equipment and adds cost and complexity to the process of forming seals.

It is an object of the present invention to simplify the manufacture and construction of dynamic oil seals.

SUMMARY OF THE INVENTION AND ADVANTAGES

A dynamic seal assembly constructed according to the invention comprises a one-piece annular carrier member having a radially outwardly extending mounting flange presenting an axially outwardly facing surface and an opposite axially inwardly facing surface. The carrier includes a seal flange spaced radially from and extending radially inwardly of the mounting flange and presenting axially outwardly and inwardly facing surfaces. An intermediate portion of the carrier extends between and interconnects the flanges and presents a first annular shoulder extending axially inwardly of the mounting flange and a second annular shoulder extending axially inwardly from the seal flange. The assembly includes an annular PTFE seal member having a radially outer edge portion and a radially inner edge portion. The seal member is disposed on the second shoulder of the carrier member with the radially outer edge portion of the seal adjacent the axially inwardly facing surface of the seal flange, and with the radially inner portion of the seal extending radially inwardly of the seal flange to present an annular sealing lip for sealing about a rotating shaft. The assembly further includes an inner annular case member disposed about the second shoulder of the carrier and staked to the second shoulder in position to compress and securely clamp the radially outer edge portion of the PTFE seal member axially between the case member and seal flange.

The invention further provides a method of fabricating a dynamic seal assembly which comprises preparing a one-piece carrier member having the aforementioned mounting and seal flanges as well as the intermediate portion and the annular PTFE sealing disc having the radially outer and radially inner portions. The radially outer portion of the sealing disc is disposed about the second shoulder of the carrier after which a case member is disposed about the second shoulder. The case member is forced axially toward the seal flange of the carrier to compress the radially outer portion of the sealing disc axially between the case member and the carrier. While the sealing disc is axially compressed, the case member is staked to the carrier to secure the case member on the carrier and to retain the sealing disc in the compressed condition.

One advantage of the invention is that a one-piece carrier is provided along with a one-piece inner case member, thereby eliminating the usual outer case member and the operations involved in forming and assembling the outer case member with the inner case member and the usual separate carrier.

The invention has the further advantage of eliminating the curling operation normally used to clamp the PTFE seal member between an inner and outer case member. The invention takes advantage of the one-piece carrier construction by employing a staking operating rather than the usual end curl, which is simpler to perform, requires fewer steps and less equipment, and yet achieves the end result of securely clamping the PTFE sealed on the carrier. Thus, the present invention greatly simplifies the construction and manufacture of seals.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
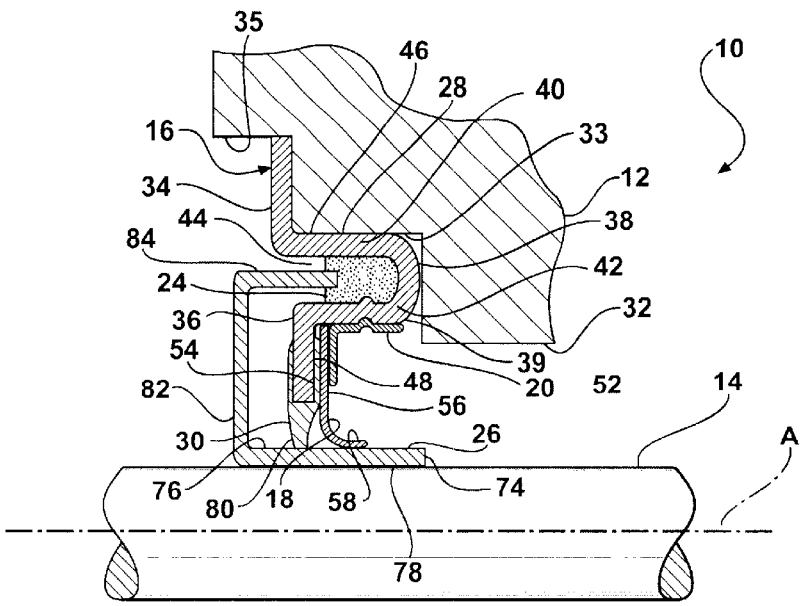
FIG. 1 is a fragmentary sectional view of a seal assembly constructed according to a presently preferred embodiment of the invention.

A dynamic seal assembly constructed according to a presently preferred embodiment of the invention is shown generally at 10 in FIG. 1 mounted in a housing 12 about a shaft 14. The shaft 14 is rotatable about an axis A of the shaft and seal assembly. The seal assembly 10 has an annular one-piece outer carrier member 16 preferably fabricated of metal. An annular seal member 18 formed of polytetrafluoroethylene (PTFE) is clamped between the carrier member 16 and an inner annular case member 20 and retained by interlocking staked portions 22. The one-piece carrier member 16 supports an annular filter medium or excluder 24. An annular metal wear sleeve 26 is received about the shaft 14 and a portion of the wear sleeve 26 is in contact with the excluder 24. A bore sealant 28 and a dust seal 30 are formed on the outer carrier member 16.

The one-piece outer carrier member 16 has a radially outwardly extending mounting flange 34 and a radially inwardly extending seal flange 36. The flanges 34, 36 are spaced radially from one another and extend generally parallel to one another and generally orthogonally to the shaft 14. The mounting flange 34 presents an axially outwardly facing surface 34a and an opposite axially inwardly facing surface 34b. The seal flange 36 has an axially outwardly facing surface 36a and an opposite axially inwardly facing surface 36b. The one-piece carrier member 16 further includes an intermediate portion 38 extending between and interconnecting the flanges 34, 36. The intermediate portion 38 has a first annular shoulder 40 extending axially inwardly from the inward surface 34b of the mounting flange 34, and a second annular should 42 extending axially inwardly from the inward surface 36b of the seal flange 36. The shoulders 40, 42 are spaced radially from one another. The intermediate portion 38 is generally U-shaped in section along the axis A, defining an axially outwardly facing annular recess or pocket 44 that projects axially inwardly beyond the inward surfaces 34b, 36b of the flanges 34, 36.

The first shoulder 40 of the carrier member 16 has a radially outer surface 46 on which the bore sealant 28 is provided, which may be any one of a number of bore sealant materials used in the art. The carrier 16 is received in a stepped bore 32 of the housing 12, with the outer surface 46 and bore sealant 28 disposed in friction or press-fit relation within an inner step 33 and the mounting flange 34 disposed within an outer step 35. The mounting flange 34 registers in the step 35 to assist in properly locating the seal assembly 10 in the bore 32. The mounting flange 34 may be received in the step 35 with a friction fit or may be bolted in place following installation.

The inner seal flange 36 of the carrier member 16 is provided with the dust seal 30 from a common sealing rubber such as Buna-n, Nitril, or the like. The dust seal 30 is preferably fixed to the inner flange 36 by being molded or bonded to the inner flange 36. An annular end portion 48 of the dust seal 30 is provided on the axially inner face 36b of the inner flange 36 and faces the clean or oil side 52 of the seal assembly 10.

The annular PTFE seal member 18 is formed as a thin washer, disc or wafer and may be machined from a PTFE billet in conventional manner. The seal member 18 has axially opposing sides 54, 56, an outer periphery 57, and a radially inner seal lip 58.

The annular case member 20 is generally L-shaped in axial section, having an axially extending first annular leg or flange 64 presenting a radially outwardly facing surface 66 generally parallel to the mating surface 39 of the second shoulder 38 of the outer carrier member 16. The case member 20 preferably fabricated of metal and has a second annular leg or flange 68 extending radially inwardly from the first flange 64 to present a generally flat face 70 on the case member 20.

Figure 2:
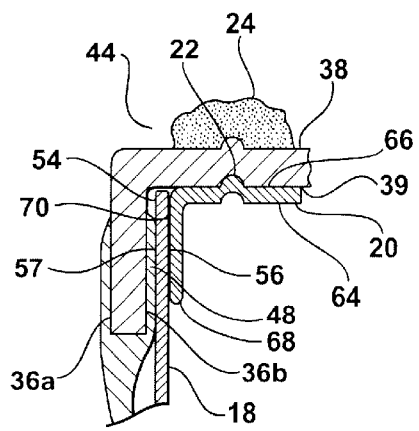
FIG. 2 is an enlarged fragmentary sectional view of the seal assembly of FIG. 1.
Figure 3:
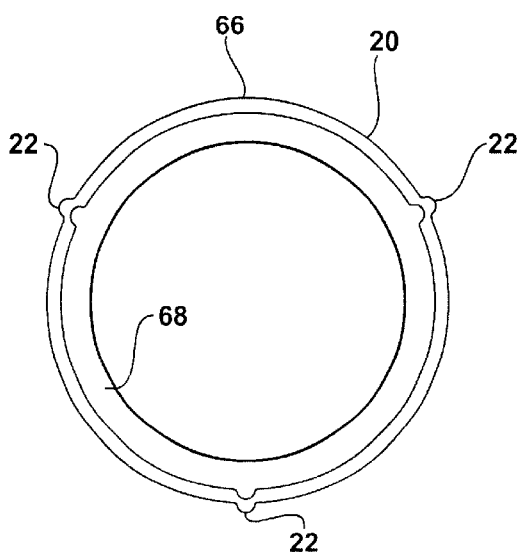
FIG. 3 is an end view of the inner case member.

To assemble the components, the seal member 18 is disposed about the second shoulder 42 with its surface 54 against the end portion 48 of the rubber seal 30. The case member 20 is then disposed about the second shoulder 42 and slid axially toward the seal member 18, bringing the face 70 of the case member into confronting engagement with the inner surface 56 of the seal member 18. An axial compressive load is then applied to the carrier member 16 and the case member 20, causing the case member 20 to move further toward the carrier 16 so as to compress the seal member 18 between the inner seal flange 36 of the carrier 16 and the second flange 68 of the case member 20. The end portion 48 of the dust seal 30 is likewise compressed to provide a fluid-tight seal between the carrier 16 and case 20. While the seal member 18 is compressed under load, the flange 64 of the clamping ring 20 is staked in the radial direction as best shown in FIG. 2, thus creating the axially interlocked portions 22 extending radially outwardly from the surface 66 of the case member 20 and extending into the surface 39 of the second shoulder 38 to retain the case member 20 in an axially stationary or fixed position relative to the carrier 16. As best shown in FIG. 3, the case member 20 is preferably staked at a plurality of locations spaced equidistant and circumferentially about the clamping ring 20, with three such stakings being shown, although more are contemplated by the invention. The staking may take on other forms other than localized dimples, such as interlocking annular ribs.

The wear sleeve 26 has a cylindrical body portion 74 providing an outer sealing surface 76. An inner bore surface 78 of the wear sleeve 26 is preferably sized to provide press-fit mounting onto the shaft 14 with the sealing surface 76 in running contact with a lip 80 of the dust seal 30 and the primary seal lip 58 of the seal member 18. The wear sleeve 26 has an annular end wall 82 extending radially outwardly of the seal surface 76 to provide a rotating slinger feature to help exclude the ingress of dust and other contaminants from reaching the dust seal 30. The end wall 82 preferably has an annular flange portion 84 extending axially inwardly toward the carrier member 16 and into the space 44, such that the flanges 40, 42 of the carrier 16 and the flange portion 84 of the wear sleeve 26 provide a labyrinth passage through the space 44.

The filter media 24 is preferably formed from a porous material, such as open-cell form or the like, to trap contaminants which may be present in the air entering the space 44. Preferably, the flange portion 84 of the wear sleeve 26 extends into the filter media 24 such that any air flowing through the labyrinth passage must pass through the filter 24.

Obviously, many modifications and variations of the present invention are possible in light of the above teachings. It is, therefore, to be understood that within the appending claims, the invention may be practiced otherwise and as specifically described. The invention is defined by the claims.

What is claimed is:

1. A dynamic seal assembly comprising:
    a one-piece annular carrier member having a radially outwardly extending mounting flange presenting an axially outwardly facing surface and an opposite axially inwardly facing surface, a seal flange spaced radially from and extending radially inwardly of said mounting flange and presenting axially outwardly and axially inwardly facing surfaces, and an intermediate portion extending between and interconnecting said radially outer mounting flange and said radially inner seal flange, said intermediate portion defining a first annular shoulder extending axially inwardly from said axially inwardly facing surface of said mounting flange and a second annular shoulder extending axially inwardly from said axially inwardly facing surface of said seal flange;
    an annular PTFE seal member having a radially outer edge portion and a radially inner edge portion, said seal member being disposed on said second shoulder of said one-piece carrier member with said radially outer edge portion of said seal adjacent said axially inwardly facing surface of said seal flange and with said radially inner edge portion of said seal member extending radially inwardly of said seal flange to present an annular seal lip of said PTFE seal member for sealing about a rotating shaft; and
    an inner annular case member disposed about said second shoulder of said one-piece carrier and secured axially by staking to said second shoulder in position to compress and securely clamp said radially outer edge portion of said PTFE seal member axially between said inner annular case member and said seal flange.

2. The assembly of claim 1 wherein said inner case member includes a radially inwardly extending annular flange portion, and an axially inwardly extending flange portion.

3. The assembly of claim 2 wherein said axially inwardly extending flange portion of said inner case member is staked to said second shoulder of said one-piece carrier member.

4. The assembly of claim 1 wherein said intermediate portion includes an annular axially outwardly facing pocket.

5. The assembly of claim 4 including a relatively rotatable annular debris shield extending axially inwardly into said pocket to provide a labyrinth passage through said pocket.

6. The assembly of claim 5 including a filter medium disposed in said pocket.

7. The assembly of claim 6 wherein said filter medium comprises a porous material.

8. The assembly of claim 7 wherein said porous material comprises a sponge.

9. The assembly of claim 1 wherein said mounting flange of said one-piece carrier is generally parallel to said seal flange.

10. The assembly of claim 1 wherein said intermediate portion of said carrier member is generally U-shaped when viewed in axial cross-section.

11. The assembly of claim 1 including a relatively rotatably wear sleeve having an annular body portion disposable about the rotating shaft for rotation therewith.

12. The assembly of claim 11 wherein said wear sleeve includes an annular debris shield extending axially outwardly of said body portion in axially outwardly spaced relation to said seal flange of said one-piece carrier member.

13. The assembly of claim 12 wherein said intermediate portion of said one-piece member includes an annular pocket and said debris shield includes a flange portion extending axially inwardly into said pocket.

14. The assembly of claim 1 wherein said one-piece carrier member and said case member are fabricated of metal.

15. The assembly of claim 1 including an annular non-PTFE seal disposed between said PTFE seal member and said seal flange of said one-piece carrier.

16. The assembly of claim 1 wherein said staking comprises a plurality of interlocking portions spaced circumferentially from one another.

17. The assembly of claim 1 including a non-PTFE seal member fixed to and projecting radially inwardly of said seal flange.

18. The assembly of claim 17 wherein said radially inwardly projection portion of said non-PTFE seal member defines a secondary annular seal lip.

19. A method of fabricating a dynamic seal assembly comprising:
preparing a one-piece carrier member having a radially outwardly extending mounting flange, a radially inwardly extending seal flange spaced radially from the mounting flange, and an intermediate portion extending between and interconnecting the mounting flange and the seal flange and providing radially spaced first and second shoulders extending axially inwardly from the mounting flange and the seal flange, respectively;
preparing an annular sealing disc of PTFE material having a radially outer portion and a radially inner portion;
disposing the radially outer portion of the sealing disc about the second shoulder of the one-piece carrier;
disposing a case member about the second shoulder;
displacing the case member axially toward the seal flange and axially compressing the radially outer portion of the sealing disc between the case member and the one-piece carrier member; and
while the seal disc is axially compressed, staking the case member to the one-piece carrier member to secure the case member on the carrier and to retain the sealing disc in said compressed condition on the carrier.

20. The method of claim 19 including forming an annular axially outwardly facing pocket in the intermediate portion of the one-piece carrier and extending a relatively rotatable flange member into the pocket.

21. The method of claim 20 including disposing a filter medium in the pocket.

* * * * *